(12) United States Patent
Lal

(10) Patent No.: US 6,832,219 B2
(45) Date of Patent: Dec. 14, 2004

(54) METHOD AND SYSTEM FOR STORING AND QUERYING OF MARKUP BASED DOCUMENTS IN A RELATIONAL DATABASE

(75) Inventor: Amrish K. Lal, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 457 days.

(21) Appl. No.: 10/100,464

(22) Filed: Mar. 18, 2002

(65) Prior Publication Data

US 2003/0182268 A1 Sep. 25, 2003

(51) Int. Cl.[7] .............................................. G06D 17/30
(52) U.S. Cl. ........................................ 707/3; 707/513
(58) Field of Search ........................... 707/1–9, 103.1, 707/104.1, 501, 513; 717/104, 100; 709/223, 206; 715/523

(56) References Cited

U.S. PATENT DOCUMENTS

| | | | |
|---|---|---|---|
| 5,870,549 A | 2/1999 | Bobo, II | 395/200.36 |
| 5,970,490 A | 10/1999 | Morgenstern | 707/10 |
| 6,199,195 B1 * | 3/2001 | Goodwin et al. | 717/104 |
| 6,209,124 B1 * | 3/2001 | Vermeire et al. | 717/114 |
| 6,226,675 B1 * | 5/2001 | Meltzer et al. | 709/223 |
| 6,356,920 B1 * | 3/2002 | Vandersluis | 715/501.1 |

OTHER PUBLICATIONS

Wang Lian Cheung, W.W. Mamoulis, N. Siu–Ming Yiu, An efficient and scalable algorithm for clustering XML doc Jan. 2004,Dept. of Comput. Sci. & Inf. Syst., Hong Kong Univ., China Knowledge and Data Engineering, vol. 16, IEEE , page(s): 82–96.*

"Using XML and Relational Databases for Internet Applications", Steve Muench—Oracle, (http://technet.oracle.com/tech/xml/info/htdocs/relational/index.htm).

"XML and Databases", Ronald Bourret, Technical University of Darmstadt, 9/99, (http://www.informatik.tu–darmstadt.de/DVS1/staff/bourret/xml/XMLAndDatabases).

"XML–DBMS", Version 1.0, Ronald Bourret, Technical University of Darmstadt, (http://www.informatik.tu–darmstadt.de/DVS1/staff/bourret/xmldbms/readme.html).

"SQL–Based XML Structured Data Access", Michael M. David, Web Techniques, vol. 4, No. 6, pp67–68, 70, 72, 6/99.

"Oracle8i—The XML Enabled Data Management System", Banerjee et al., Proceed. of 16th Int. Conf. on Data Engineering, pp 561–568, 2000.

"Relational Databases foe Querying XML Documents: Limitations and Oportunities" Shanmugasundaram et al., Proceed. of 25th Int. Conf. on Very Large Data Bases, pp302–314, 9/99.

* cited by examiner

*Primary Examiner*—Diane D. Mizrahi
(74) *Attorney, Agent, or Firm*—Sandra M. Parker, Esq.

(57) ABSTRACT

An apparatus, article of manufacture and computer-based markup serialization method is provided for transferring data contained in a markup based document, such as an Extensible Markup Language (XML) document, into a relational database stored in an electronic storage device having a database management system. They are used for easy subsequent retrieval of data from the database in the XML format and reconstruction of the XML document. The method decomposes the document according to basic markup types of the documents' data components and stores the decomposed document in a set of markup tables created in the database, one markup table for each basic markup type, thereby preserving the hierarchical tree structure, parent-child order, and components of the document. For querying the database markup tables the method uses SQL queries to retrieve the XML document components in the XML format.

42 Claims, 3 Drawing Sheets

METHOD AND SYSTEM FOR STORING AND QUERYING OF MARKUP BASED DOCUMENTS IN A RELATIONAL DATABASE

BACKGROUND OF THE INVENTION

1. Field of the Invention

This invention relates in general to database management systems performed by computers, and in particular to an optimized method and system for decomposing and storing of markup based documents, such as XML documents, in a relational database. This allows easy and fast subsequent retrieval of data from the database in the XML format and reconstruction of the XML document.

2. Description of Related Art

Databases are computerized information storage and retrieval systems. A Relational Database Management System (RDBMS) is a database management system (DBMS) which uses relational techniques for storing and retrieving data. RDBMS software using a Structured Query Language (SQL) interface is well known in the art. The SQL interface has evolved into a standard language for RDBMS software and has been adopted as such by both the American National Standards Organization (ANSI) and the International Standards Organization (ISO).

Extensible Markup language (XML) is a standard used for representing data on the Internet in a hierarchical data format and for information exchange on the World Wide Web. Presently, there is a need for a an optimized method and system for serializing and storing of XML documents in a relational database, which preserves the structure of the XML document for subsequent querying of XML document components.

An XML document consists of nested element structures, starting with a root element. An XML document is tree-structured, with each node in the tree representing an element being described by a name. Data describing an element can be in the form of attributes or sub-elements. An "id" attribute uniquely identifies an element within an XML document and can be used to reference the element from another element. An XML document uses tags to describe the type of data following the tag. Thus, an XML document is self-describing because the data can be interpreted by a remote user without an input from the creator of the document.

There are numerous conventional software products used for transferring data contained in an XML document into a database. They consist of modules capable of decomposing the XML document and storing it in a database. For querying the database to obtain the XML data, conventional products usually use an XML query to search the contents of the XML document for elements or attributes. Moreover, most such products store data in an object-relational database. Some conventional products use structural serialization which is performed on the basis of the hierarchical structure of XML documents. In the structural serialization of XML documents the tree structure of an XML document is mapped to a set of relational tables. However, this often leads to a large number of tables for even a simple XML document. Moreover, when the serialization is carried out using the structural serialization method, the queries usually need to have some kind of mapping information in order to obtain valid results, since there is a need to perform a mapping between an XML schema and a relational database schema. While there have been various techniques developed for decomposing and storing of markup based documents, such as XML documents, in a database, there is a need for a simple, optimized and generic method for serializing and storing of markup based documents in a relational database, which allows easy and fast subsequent retrieval of data from the database in the original format and reconstruction of the document. Moreover, such method has to be independent of the hierarchical structure and structural complexity of the stored document.

SUMMARY OF THE INVENTION

The foregoing and other objects, features, and advantages of the present invention will be apparent from the following detailed description of the preferred embodiments, which makes reference to several drawing figures.

One preferred embodiment of the present invention is a computer-based markup serialization method for transferring data contained in a markup based document, such as an Extensible Markup Language (XML) document, into a relational database stored in an electronic storage device having a database management system. It is used for easy subsequent retrieval of data from the database in the XML format and reconstruction of the XML document. The method decomposes the document according to basic markup types of the documents' data components and stores the decomposed document in a set of markup tables created in the database, one markup table for each basic markup type, thereby preserving the hierarchical tree structure, parent-child order, and components of the document. The basic markup types of an XML document are ATTRIBUTE, CDATA_SECTION, COMMENT, DOCUMENT_FRAGMENT, DOCUMENT, DOCUMENT_TYPE, ELEMENT, ENTITY, ENTITY_REFERENCE, NOTATION, PROCESSING_INSTRUCTION and TEXT. For querying the database markup tables the method uses SQL queries to retrieve the XML document components in the XML format.

Another preferred embodiment of the present invention is a system implementing the above-mentioned method embodiment of the present invention.

Yet another preferred embodiment of the present invention includes a computer usable medium tangibly embodying a program of instructions executable by the computer to perform method steps of the above-mentioned method embodiment of the present invention.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description of the preferred embodiments reference is made to the accompanying drawings, which form the part thereof, and in which are shown by way of illustration specific embodiments in which the invention may be practiced. It is to be understood that other embodiments may be utilized and structural and functional changes may be made without departing from the scope of the present invention.

The present invention discloses a system, method and program storage device embodying a program of instructions executable by a computer to perform the method of the present invention for serializing, storing and querying of a markup based documents, such as Extensible Markup Language (XML) documents, in a relational database. The method and system may be used in a distributed computing environment in which two or more computer systems are connected by a network such as World Wide Web, including environments in which the networked computers are of different type.

Figure 1:
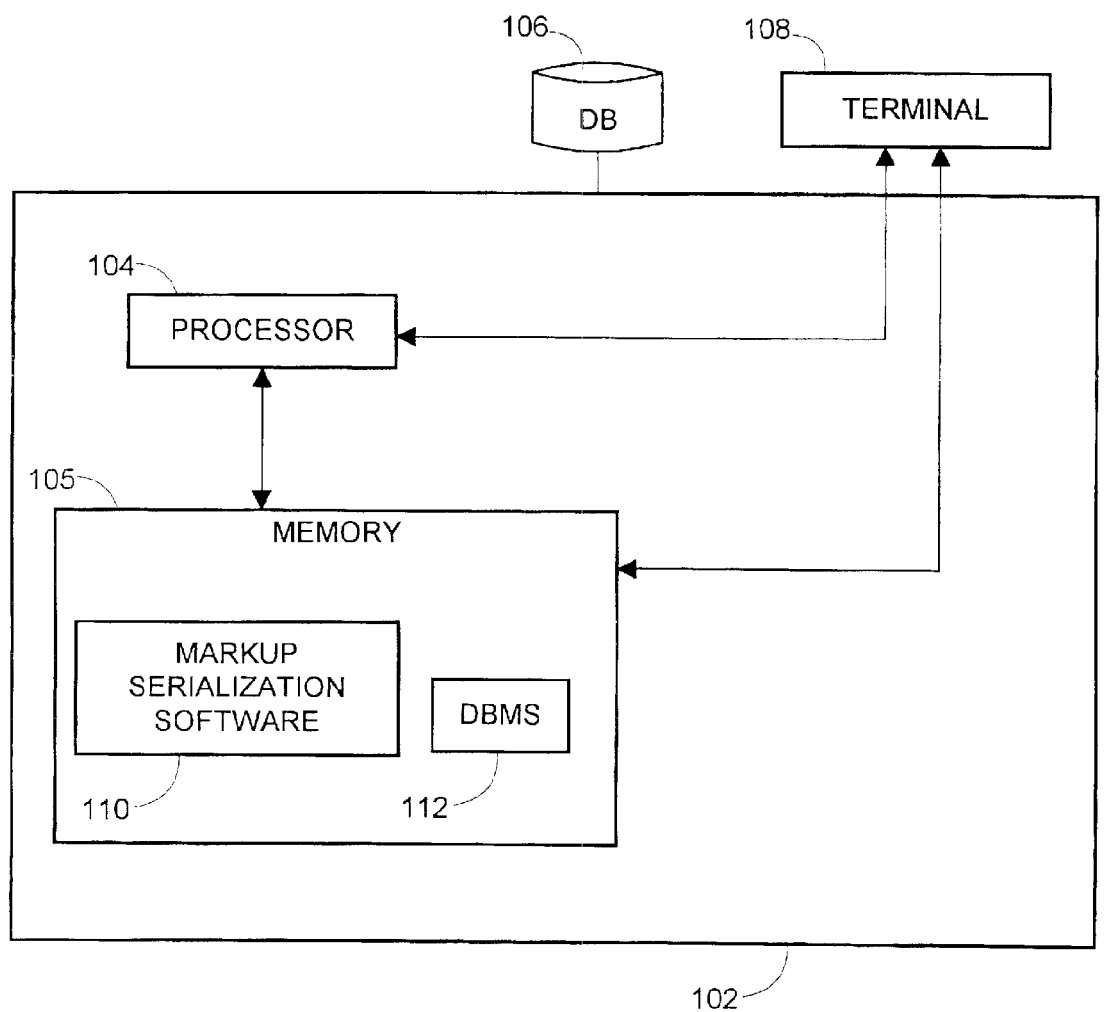
FIG. 1 illustrates a computer hardware and software environment enabling markup serialization, according to the preferred embodiments of the present invention.

FIG. 1 illustrates an exemplary computer hardware and software environment usable by the preferred embodiments of the present invention, including a console 102 having one or more conventional processors 104 executing instructions stored in an associated computer memory 105, and having a console terminal 108. The operating memory 105 can be loaded with instructions received through an optional storage drive or through an interface with a computer network.

The processor 104 is connected to one or more electronic storage devices 106, such as disk drives, that store one or more relational databases. They may comprise, for example, optical disk drives, magnetic tapes and/or semiconductor memory. Each storage device permits receipt of a program storage device, such as a magnetic media diskette, magnetic tape, optical disk, semiconductor memory and other machine-readable storage device, and allows for method program steps recorded on the program storage device to be read and transferred into the computer memory. The recorded program instructions may include the code for the method embodiment of the present invention. Alternatively, the program steps can be received into the operating memory from a computer over the network.

Operators of the console terminal 108 use a standard operator terminal interface (not shown), such as IMS/DB/DC, CICS, TSO, OS/2 or other similar interface, to transmit electrical signals to and from the console 102, that represent commands for performing various tasks, such as search and retrieval functions, termed queries, against the databases stored on the electronic storage device 106. In the present invention, these queries conform to the Structured Query Language (SQL) standard, and invoke functions performed by a DataBase Management System (DBMS) 112 located at the console 102, such as a Relational DataBase Management System (RDBMS) software. In the preferred embodiments of the present invention, the RDBMS software is the DB2 product, offered by IBM for the AS400, OS390 or OS/2 operating systems, the Microsoft Windows operating systems, or any of the UNIX-based operating systems supported by the DB2. Those skilled in the art will recognize, however, that the present invention has application to any RDBMS software that uses SQL, and may similarly be applied to non-SQL queries and probably even to non-relational databases.

FIG. 1 further illustrates a software environment enabling preferred embodiments of the present invention. In the system shown in FIG. 1 the console 102 further includes a markup serialization software 110 of the present invention. The computer-based markup serialization software 110 incorporates a method for transferring data contained in a markup based document, such as an XML document, into a relational database stored in an electronic storage device having a database management system. It is used for easy subsequent retrieval of data from the database in the original document format, such as the XML format, and reconstruction of the document. Although the description of the preferred embodiments of the present invention will be based on XML documents, the present invention is applicable to any type of markup based documents.

The preferred method embodiment of the present invention decomposes the XML document according to basic markup types of XML documents' data components and stores the decomposed XML document in a set of markup tables created in the database, one markup table for each basic markup type, thereby preserving the hierarchical tree structure, parent-child order, and components of the XML document. The basic markup types are ATTRIBUTE, CDATA_SECTION, COMMENT, DOCUMENT_FRAGMENT, DOCUMENT, DOCUMENT_TYPE, ELEMENT, ENTITY, ENTITY_REFERENCE, NOTATION, PROCESSING_INSTRUCTION and TEXT. For querying the database markup tables the method preferably uses SQL queries to retrieve the XML document components in the XML format.

The method preferably uses a hybrid approach for querying data, utilizing functions found both inside and outside of the relational database and RDBMS engine. The querying of the XML documents in the preferred embodiments of the present invention is preferably performed using SQL queries on the relational database data. The method preferably uses the RDBMS engine in order to perform fast searches. Formatting or transformation of relational data into XML data has to be carried out in a utility program created outside of the relational database system, in a middleware component.

The markup serialization technique of the present invention is not based on the hierarchical structure of XML documents, as are some conventional products. The markup serialization of the present invention is the serialization carried out on the basis of available markup types of the markup based document. Presently, there are twelve basic markup types of XML document components and all are preserved in the relational database. Thus, the preferred embodiments of the present invention preserve the hierarchical tree structure and parent-child order of a markup based document, as well as the character data and attribute values found in that document. Moreover, they preserve the document type declarations and physical structure of the document, such as entity use, CDATA sections and document encodings.

In the preferred method of the present invention the serialization and storage of an XML document is accomplished according to the twelve different basic types of markup that an XML document can have. These different types of markup are: ATTRIBUTE_NODE, CDATA_SECTION NODE, COMMENT_NODE, DOCUMENT_FRAGMENT_NODE, DOCUMENT_NODE, DOCUMENT_TYPE_NODE, ELEMENT_NODE, ENTITY_NODE, ENTITY_REFERENCE_NODE, TEXT_NODE, NOTATION_NODE and PROCESSING_INSTRUCTION_NODE. Each XML document has pre-existing markup tags describing the markup type of the data following the tag.

The serialization of an XML document on the basis of document markup types (markup serialization) rather than on the basis of document structure (structural serialization)

offers several key advantages. Since there are only twelve basic markup types, maximum number of relational tables required in the markup serialization is twelve, irrespective of the complexity of the XML document. However, in the structural serialization of XML documents the tree structure of an XML document is mapped to a set of relational tables which often leads to a large number of tables for even a simple XML document. Moreover, because the markup serialization does not produce a large number of tables, querying the data produced by the markup serialization is usually faster and less complex. Another advantage of the markup serialization is that querying and searching through a serialized form of an XML document obtained through the markup serialization is simpler, since there is no need to perform a mapping between an XML schema and a relational database schema. When the serialization is carried out using a structural serialization, the queries usually need to have some kind of mapping information to obtain valid results.

In the preferred embodiments of the present invention the parsing and storing of an XML document is carried out by first serializing the XML document, while preserving the parent-child relationship between elements, and then storing the data into a series of relational database markup tables. This markup serialization and storage of an XML document X can be carried out by an algorithm such as the algorithm described below.

```
SERIALIZE_XML_DOCUMENT(X)
1. ID = 0
2. XTREE <-- root of an XML parse tree
3. XTREE = PARSE_XML_DOCUMENT(X)
4. CREATE_MARKUP_TABLES()
5. POPULATE_TABLES(ID, XTREE)
```

In this algorithm of the preferred embodiments of the present invention, line 2 initializes a pointer XTREE to a root of an XML parse tree. The XML parse tree is obtained by parsing the XML document in step 3, using a conventional XML parser routine, such as IBM XML4J parser, or a user-supplied parser utility. Once an XML parse tree is available and pointed to by the variable XTREE, twelve tables, one for each type of markup, are created in step 4 by calling the function CREATE_MARKUP_TABLES( ). Step 5 carries out the serialization of the XML parse tree pointed to by the variable XTREE, and populates the relational tables, created in step 4, with serialized data. The serialization creates the serialized data by traversing the XML parse tree node by node and collecting information about each node. Variable 'ID' is a global variable that is common to all functions described in this algorithm. It is used to generate a unique id for each node in the XML parse tree obtained by parsing the XML document. During the serialization, the markup type of each node is identified by the preceding markup tag and each node is assigned a unique node id number, which represents the position of that node in the XML node hierarchy. Next, the information about each node is stored in a corresponding markup table, according to the node's markup type.

The function CREATE_MARKUP_TABLES creates twelve relational database tables, one table for each type of markup that can occur in an XML document. In the present invention the tables created by the function CREATE_MARKUP_TABLES are named as: ATTRIBUTE, CDATA_SECTION, COMMENT, DOCUMENT_FRAGMENT, DOCUMENT, DOCUMENT_TYPE, ELEMENT, ENTITY, ENTITY_REFERENCE, NOTATION, PROCESSING_INSTRUCTION, and TEXT. They correspond to the nodes of each markup type that the XML document parse tree can have: ATTRIBUTE_NODE, CDATA_SECTION_NODE, COMMENT_NODE, DOCUMENT_FRAGMENT_NODE, DOCUMENT_NODE, DOCUMENT_TYPE_NODE, ELEMENT_NODE, ENTITY_NODE, ENTITY_REFERENCE_NODE, TEXT_NODE, NOTATION_NODE, PROCESSING_INSTRUCTION_NODE.

In the preferred embodiments of the present invention each record in the twelve markup tables contains information about a node in the XML parse tree of the XML document. Each node will appear only once in any one of the tables used to store the XML document, because they are stored in the tables according to the markup type. Each record of the twelve markup tables contains the following columns that describe a node: PID representing id of the parent node, ID representing id of this node, NAME of the node or element, and VALUE represented by this node. There is no need for the markup type column in any table rows, because the markup type of each node corresponds to the markup of the table, and is the same for all the rows in a given table, since any of the twelve markup tables is used to store information about nodes of only one type.

The root element of the XML document is stored in the ELEMENT table and always has an id=0. The children elements of the root element are also stored in the ELEMENTS table. An element node may have its attributes, which are defined as attribute nodes and stored in the ATTRIBUTE table. The pid of each ATTRIBUTE record points to the id of the element stored in the ELEMENT table record which contains that element record. Similarly, information about data with other types of markup are set up in other markup tables. Thus, the entire XML document is stored in its serialized format along with additional information (id and pid) necessary to recreate the original XML document or its part.

In the preferred embodiments of the present invention the population of the twelve markup tables created for the XML document X, performed in step 5 above and defined as POPULATE_TABLES(ID, XTREE), is carried out by the algorithm described below.

```
POPULATE_TABLES(pid, node)
    1. ID = ID + 1
    2. if xmlnode.type == ATTRIBUTE_NODE
    3. INSERT_DATA_INTO_TABLE("ATTRIBUTE", pid, ID,
    node.name, node.value)
    4. if xmlnode.type == CDATA_SECTION_NODE
    5. INSERT_DATA_INTO_TABLE("CDATA_SECTION", pid
    ID, node.name, node.value)
    6. if xmlnode.type == COMMENT_NODE
    7. INSERT_DATA_INTO_TABLE("COMMENT_NODE", pid
    ID, node.name, node.value)
    8. if xmlnode.type == DOCUMENT_FRAGMENT_NODE
    9. INSERT_DATA_INTO_TABLE
    ("DOCUMENT_FRAGMENT", pid, ID, node.name, node.value)
    10. if xmlnode.type DOCUMENT_NODE
    11. INSERT_DATA_INTO_TABLE("DOCUMENT", pid, ID,
    node.name, node.value)
    12. if xmlnode.type == DOCUMENT_TYPE_NODE
    13. INSERT_DATA_INTO_TABLE
    ("DOCUMENT_TYPE", pid, ID, node.name, node.value)
    14. if xmlnode.type == ELEMENT_NODE
    15. INSERT_DATA_INTO_TABLE("ELEMENT", pid, ID,
    node.name, node.value)
```

-continued

```
16. if xmlnode.type == ENTITY_NODE
17. INSERT_DATA_INTO_TABLE("ENTITY", pid, ID,
    node.name, node.value)
18. if xmlnode.type == ENTITY_REFERENCE_NODE
19. INSERT_DATA_INTO_TABLE
    ("ENTITY_REFERENCE", pid, ID, node.name, node.value)
20. if xmlnode.type == NOTATION_NODE
21. INSERT_DATA_INTO_TABLE
    ("NOTATION", pid, ID, node.name, node.value)
22. if xmlnode.type == PROCESSING_INSTRUCTION_NODE
23. INSERT_DATA_INTO_TABLE
    ("PROCESSING_INSTRUCTION", pid, ID, node.name,
    node.value)
24. if xmlnode.TYPE == TEXT_NODE
25. INSERT_DATA_INTO_TABLE("TEXT", pid, ID, node.name,
    node.value)
26. if NODE_HAS_ATTRIBUTES(node)
27. For each attribute Na of node
28. POPULATE_TABLES(ID, Na)
29. if NODE_HAS_SIBLINGS(node)
30. For each sibling Ns of node
31. POPULATE_TABLES(ID, Ns)
32. if NODE_HAS_CHILDREN(node)
33. For each child Nc of node
34. POPULATE_TABLES(ID, Nc)
35. RETURN
```

The function POPULATE_TABLES (pid, node) takes the pid representing the id of the parent of a node and inserts this and all the other information about the node into one of the twelve markup tables, depending upon the markup type of the node, as shown in steps 2 to 25. In each pass, the global variable ID is incremented to create the unique id of the node. Steps 26 through 31 handle attributes of the node, if they exist, by recursively executing the same routine. Similarly, steps 32 to 34 handle the children of the node by executing the same routine recursively. This function will serialize an entire XML document given a node that points to a parse tree of an XML document. In this case, as shown in step 5 of the main function SERIALIZE_XML_DOCUMENT(X) above, the function is defined as POPULATE_TABLES(ID, XTREE), where ID=0 as set in step 1, and 'node' has the value XTREE.

In the preferred embodiments of the present invention function INSERT_DATA_INTO_TABLE is a function that inserts data about each node into the specified markup table. The first argument of this function is the name of the markup table into which the data is to be inserted. Other arguments are: PID, which is an id of the parent node, ID of this node, NAME, which is the name of the node, and VALUE, which is the value represented by this node.

Since an XML document may not have all twelve types of markup, some of the twelve created markup tables may remain empty. Often an XML document contains only four types of markup: elements, attributes, comment and processing instructions. In this case, only four tables will be populated and the remaining eight tables will go unused and may be deleted.

Once the XML document is stored in the database, it is possible to use other functions of the present invention, namely, querying of the database markup tables to obtain certain requested XML data, and reconstruction of the original XML document partially or in its entirety. In the preferred embodiments of the present invention the querying of the previously created markup tables to obtain XML data from the original XML document is preferably performed using the SQL SELECT syntax and is accomplished as follows. An XML result set is produced in two stages, and is made up of one or more XML elements. Since the markup tables are preferably relational tables, the first stage is the SQL Querying stage which includes querying of the twelve markup relational tables with XML data to obtain a relational result set. The second stage is the Result Set Transformation stage which transforms the relational result set, obtained in the first stage, to obtain an XML result set. The SQL Querying stage is preferably accomplished using the functionality available inside the RDBMS engine. The Result Set Transformation stage is preferably performed in a middleware component, outside of the RDBMS engine.

The first stage, SQL Querying, selects the elements defined by the user-defined markup type and firstly determines which one of the twelve types of markup a user is looking for. For example, if the user is looking for a node of the markup type ELEMENT_NODE and with node name <NAME>, the following SQL query can be used:

```
Q1) SELECT *
    FROM elements
    WHERE name = 'NAME';
```

Similarly, if the user only wants to see the elements which have node name <NAME> and the node value 'Albert', the following query can be used:

```
Q2) SELECT *
    FROM elements
    WHERE name = 'NAME'
    AND value = 'Albert';
```

The entire original XML document can be recreated using the query:

Q3) SELECT* FROM elements;

Each of these exemplary queries produces a relational result set of data that will be transformed into an XML result set in the next stage. The Result Set Transformation stage of the present invention may expect the relational result set to be in a certain format. In the present invention, as described above, the relational result set always has to contain columns pid, id, name, and value of the element, and has to be ordered by the column id. Therefore, in this implementation of the present invention the queries Q1, Q2, Q3 have to be substituted with queries Q4, Q5, and Q6 to conform to this requirement.

```
Q4) SELECT pid, id, name, value
    FROM ELEMENTS
    WHERE name = 'NAME'
    ORDER BY id
Q5) SELECT pid, id, name, value
    FROM ELEMENTS
    WHERE name = 'NAME' and value = 'Albert'
    ORDER BY id
Q6) SELECT pid, id, name, value
    FROM ELEMENTS
    ORDER BY id
```

In the present invention the query can contain joins, relational operators and any other SQL syntax supported in a given RDBMS, provided that the result set always contains pid, id, name, and value of element of the XML result set, and is ordered by id. An example of a more complex query is given below.

```
Q7) SELECT e.pid, e.id, e.name, e.value
    FROM attributes a, elements e
    WHERE a.pid = e.id
    AND e.id IN (SELECT max(id) from elements group by pid)
    ORDER BY e.id
```

The second stage, the Result Set Transformation of a relational result set to an XML result set, is carried out by using the algorithm described below.

```
RELATIONAL_TO_XML_TRANSFORMATION(R)
1. X <-- XML result set
2. For each row Ri in the relational result set R
3. Xi = CREATE_XML_ELEMENT_FOR_ROW(Ri.id ,Ri.name, Ri.value)
4. Xi = Xi + GET_DESCENDANT_XML_ELEMENTS_OF_ROW (Ri.id)
5. RETURN (X)
```

Given a relational result set 'R' obtained by an SQL query, as described above, the function RELATIONAL_TO_XML_TRANSFORMATION(R) will convert the relational result set into an XML result set. Lines 2 to 4 iterate over each row Ri of the relational result set R to obtain each element (Xi) of the XML result set X. The algorithm steps through the relational result set one row at the time and moves downwards, getting that row's descendant element, attributes, text, etc. For each row or element a name and value column data are used to reconstruct the XML element. Then, a function recursively launches queries to get name and value of all descendant elements of the XML element, starting with the id of the element row of step 2. As shown below, in step 4 the SQL queries are executed to obtain and format attributes of each descendant, by querying the ATTRIBUTE table with the pid of the XML element. The function may query other tables, if needed. Thus, SQL queries may be executed to format text section of each descendant by querying the TEXT table with the pid of the XML element. It should be noted that while moving downwards on the relational result set, the function may encounter element rows which have already been processed as descendants or element-rows that came earlier. Thus, the function preferably keeps track of and ignores the rows which would create erroneous elements in the XML result set, such as duplicates or misplaced elements.

The function CREATE_XML_ELEMENT_FOR_ROW is called in line 3 to create an XML element of the XML result set. Then, the function GET_DESCENDANT_XML_ELEMENTS_OF_ROW is called in line 4 to get the descendant XML elements of the element Xi obtained in line 3. The results from function calls in lines 3 and 4 are combined in step 4 to get the complete XML element of the XML result set.

Finally, when the step 2 iterating over all the rows of the relational result set R is completed, the XML result set X is returned in line 5.

The function CREATE_XML_ELEMENT_FOR_ROW(Ri.id ,Ri.name, Ri.value) is in the preferred embodiments of the present invention defined as shown below.

```
CREATE_XML_ELEMENT_FOR_ROW(row.id, row.name, row.value)
1. XE <-- XML element
2. if (row.value == NULL)
3. XE = "<" + row.name + "/>"
4. else
5. XE = "K" + row.name
6. XE = XE + GET_ATTRIBUTES_FOR_ELEMENT(row.id)
7. XE = XE + "</" +row.value + ">"
8. RETURN (XE);
```

The function CREATE_XML_ELEMENT_FOR_ROW takes the name and value of an XML element and tags it accordingly to produce properly tagged XML data. In line 6, the function GET_ATTRIBUTES_FOR_ELEMENT is called to get all attributes of the element specified with the row 'row'. Lines 5 through 7 combine name, data, and attributes of an XML element to produce a single complete XML element XE, which is in XML format.

```
GET_ATTRIBUTES_FOR_ELEMENT(row.id)
1. QUERY <-- SELECT pid,id,name,value FROM attributes WHERE pid = row.id
2. R <-- relational result set
3. XA <-- XML attribute
3. R = EXECUTE_SQL_QUERY(QUERY)
4. For each row Ri in result set R
5. XA = XA + " " + Ri.name + " = " + Ri.value
6. RETURN(XA)
```

The function GET_ATTRIBUTES_FOR_ELEMENT (row.id) queries the "ATTRIBUTE" markup table to get all the attributes of the element pointed to by the id 'row.id'. These attributes are then properly formatted in line 5 and returned to the caller in line 6.

```
GET_DESCENDANT_XML_ELEMENTS_OF_ROW(row.id)
1. QUERY <-- SELECT pid,id,name,value FROM elements WHERE pid = row.id
2. R <-- relational result set.
3. XD <-- XML element
4. R = EXECUTE_SQL_QUERY(QUERY)
5. For each row Ri in result set R
6. XD = XD + CREATE_XML_ELEMENT_FOR_ROW(Ri.id, Ri.name, Ri.value)
7. XD = XD + GET_DESCENDANT_XML_ELEMENTS_OF_ROW(Ri.id)
8. RETURN(XD)
```

GET_DECENTDANT_XML_ELEMENTS_OF_ROW(row.id) is a recursive function similar to the CREATE_XML_ELEMENT_FOR_ROW(row.id). This function gets XML formatted data from a row that also includes descendant (child) elements.

Some preferred embodiments of the present invention, like other good XML processors, are also able to query filter element(s), based on an element path expression. The algorithm presented above reaches each element by traversing its path from the root element. Hence, when needed to query filter element(s), a modification of the algorithm presented above is used. It keeps track of a path of each element and filters out the specified element from the result node, when requested in the filtering query.

The present invention provides simple and fast decomposition and querying, independent of the structural complexity of an XML document. Number of required relational tables is small and independent of the structural complexity of an XML document. In the present invention simpler querying is obtained by using SQL queries and RDBMS, since XML schema does not have to be mapped with the corresponding relational shema, and querying is fast since there is a small number of markup tables.

Figure 2:
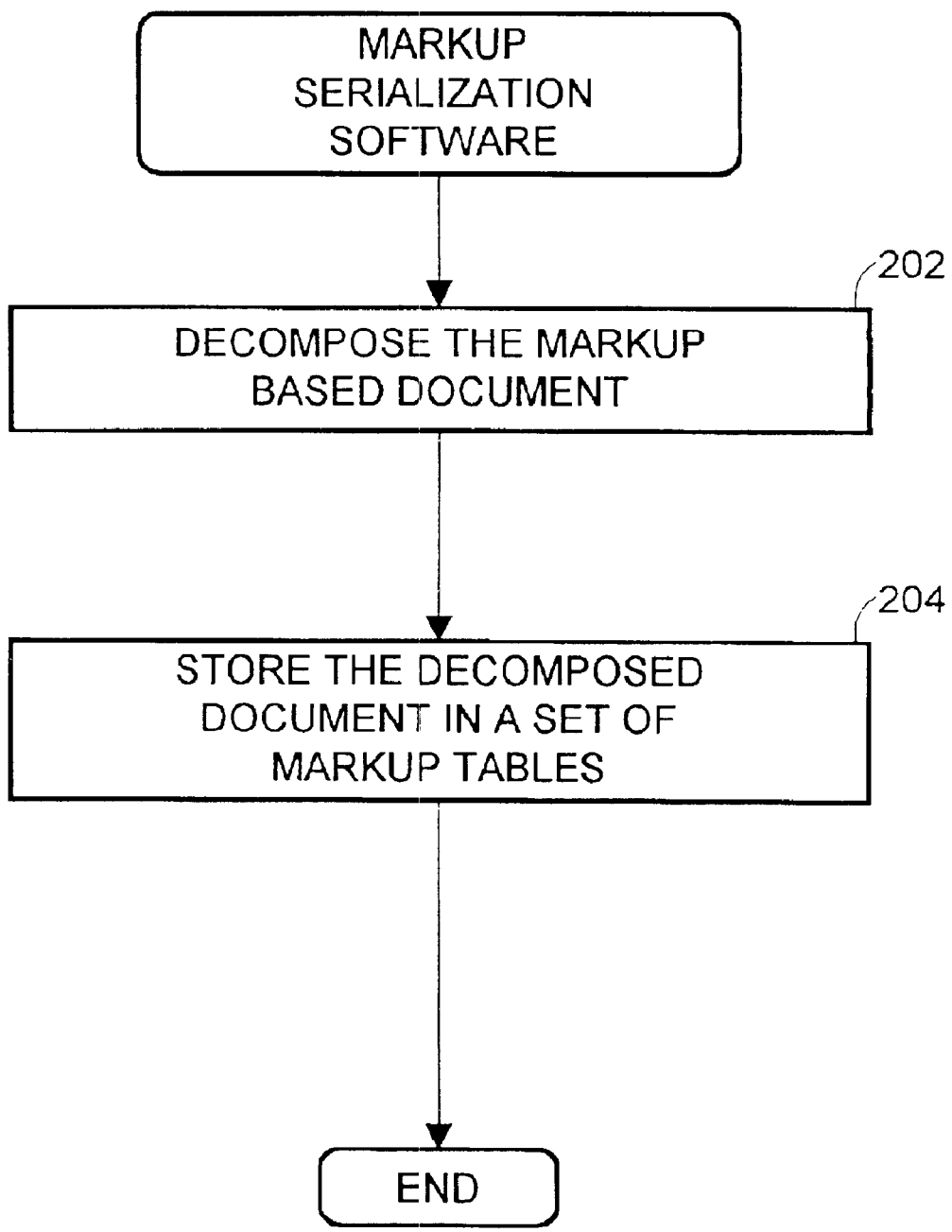
FIG. 2 illustrates a flowchart of the markup serialization software, according to the preferred embodiments of the present invention.

The flowchart of a computer-based markup serialization method used for transferring data contained in any type of a markup based document into a relational database is illustrated in FIG. 2. Step 202 is used for decomposing the markup based document according to basic markup types of the documents' data components. Storing step 204 performs storage of the decomposed document in a set of markup tables created in the database, one markup table for each basic markup type.

Figure 3:
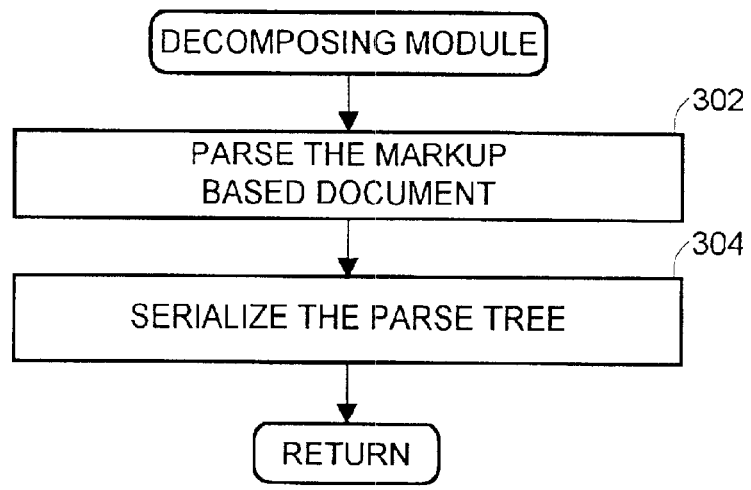
FIG. 3 illustrates a flowchart of the module used for the markup based document decomposition, according to the preferred embodiments of the present invention.

The decomposing step 202 is shown in detail in FIG. 3. It includes a step 302 for parsing the document to create a nested parse tree, and a step 304 for serializing the parse tree by traversing the path of each node from the root, wherein a basic markup type of each node is identified by a markup tag in the document describing the markup type of a data component following the markup tag, and wherein each node is described by a name, attributes, and an id representing the position of the node in the parse tree. In the storing step 204 each node data is stored in a record of at least one markup table according to the node's markup type, and each record contains a node id, node name (NAME), node parent (PID), and node data value (VALUE) columns.

Figure 4:
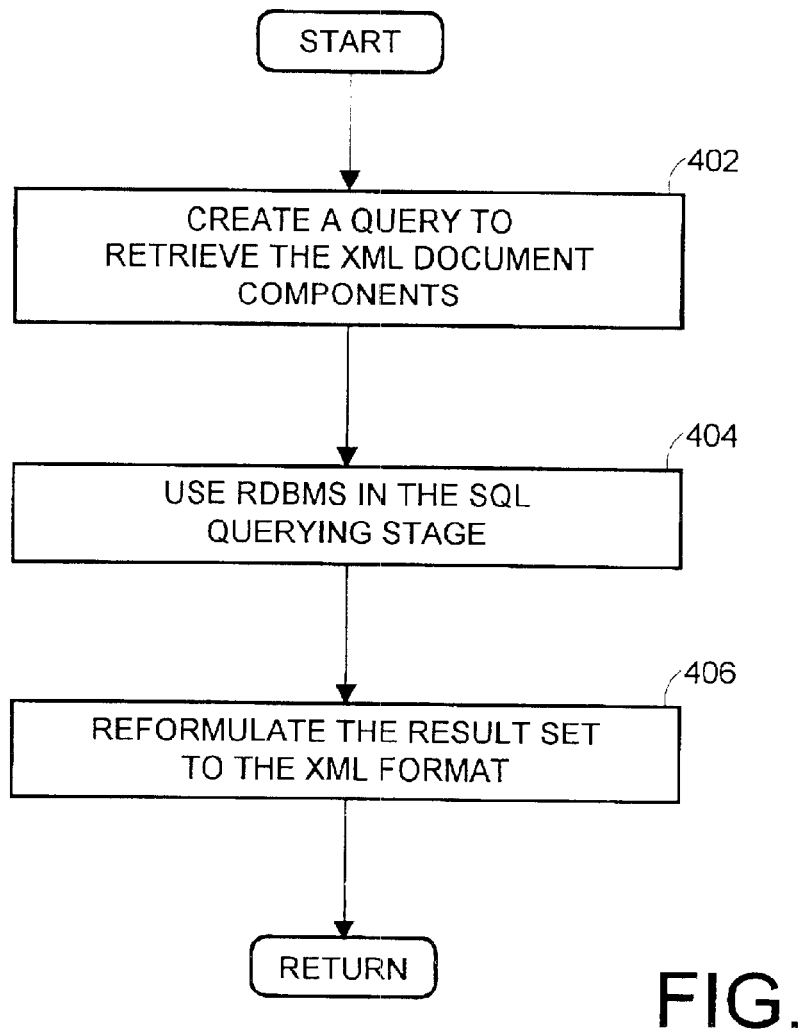
FIG. 4 illustrates a flowchart used for querying the database markup tables, according to the preferred embodiments of the present invention.

FIG. 4 illustrates steps used for querying the database markup tables. Step 402 creates an SQL query used to retrieve the XML document components in the XML format. The query is used in two stages, needed for reformatting a result set into the XML format. Step 404 is used in a SQL querying stage and utilizes the RDBMS for querying the markup tables to obtain a data result set. Step 406 is used in a result set transformation stage for re-formatting the data result set into an XML data result set. The querying step can be used to create a reconstructed XML document by selecting all elements from the markup tables in the query created in step 402.

The present invention may provide UNIX, Windows and other platform support. It will preferably be used for developing applications for DB2 machines. The present invention works with any of the IBM database manager products, such as DB2 for VM/VSE, DB2 for OS/390, DB2 for AS/400, DB2 Common Server, DB2 Universal Database. However, the technology may be applied to any other database manager products, such as Oracle, Informix, Sybase, SQL Anywhere, and Microsoft SQL Server, and other relational and possibly non-relational products.

The foregoing description of the preferred embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A computer-based markup serialization method for transferring data contained in an Extensible Markup Language (XML) document into a relational database stored in an electronic storage device having a database management system, for easy subsequent retrieval of data from the database in the XML format and reconstruction of the XML document, the method comprising the steps of:
   (a) decomposing the XML document according to basic markup types of XML documents' data components; and
   (b) storing the decomposed XML document in a set of markup tables created in the database, one markup table for each basic markup type.

2. The method according to claim 1, wherein the basic markup types are selected from a group comprising ATTRIBUTE, CDATA_SECTION, COMMENT, DOCUMENT_FRAGMENT, DOCUMENT, DOCUMENT_TYPE, ELEMENT, ENTITY, ENTITY_REFERENCE, NOTATION, PROCESSING_INSTRUCTION and TEXT markup types.

3. The method according to claim 1, wherein the decomposing step includes parsing the XML document to create a nested XML parse tree, and serializing the XML parse tree by traversing the path of each node from the root, wherein a basic markup type of each said node is identified by a markup tag in the XML document describing the markup type of a data component following the markup tag, and wherein each said node is described by a name, attributes, and an id representing the position of said node in the XML parse tree.

4. The method according to claim 3, wherein in the storing step each said node data is stored in a record of at least one markup table according to the node's markup type, and wherein each said record contains a node id, node name (NAME), node parent (PID), and node data value (VALUE) columns.

5. The method according to claim 4, wherein the XML parse tree root, node elements, node element's descendants and siblings are stored in an ELEMENT table, and each node element's attribute is stored in an ATTRIBUTE table, and wherein the node parent PID of each said ATTRIBUTE table record points to the id of the node element record in the ELEMENT table.

6. The method according to claim 1, further comprising a step of querying the database markup tables using SQL queries to retrieve the XML document components in the XML format.

7. The method according to claim 6, wherein the querying step creating an XML result set in two stages, a SQL querying stage querying the markup tables to obtain a data result set, and a result set transformation stage for re-formatting the data result set to an XML data result set.

8. The method according to claim 7, further comprising a step of creating a reconstructed XML document by selecting all elements from the markup tables in the querying step.

9. A computer-based XML markup serialization processor system for transferring data contained in an Extensible Markup Language (XML) document into a relational database stored in an electronic storage device having a database management system, for easy subsequent retrieval of data from the database in the XML format and reconstruction of the XML document, the system comprising:
   means for decomposing the XML document according to basic markup types of XML documents' data components; and
   means for storing the decomposed XML document in a set of markup tables created in the database, one markup table for each basic markup type.

10. The system according to claim 9, wherein the basic markup types are selected from a group comprising ATTRIBUTE, CDATA_SECTION, COMMENT, DOCUMENT_FRAGMENT, DOCUMENT, DOCUMENT_TYPE, ELEMENT, ENTITY, ENTITY_REFERENCE, NOTATION, PROCESSING_INSTRUCTION and TEXT markup types.

11. The system according to claim 9, wherein the decomposing means includes means for parsing the XML document to create a nested XML parse tree, and serializing the XML parse tree by traversing the path of each node from the root, wherein a basic markup type of each said node is identified by a markup tag in the XML document describing the markup type of a data component following the markup tag, and wherein each said node is described by a name, attributes, and an id representing the position of said node in the XML parse tree.

12. The system according to claim 11, wherein with the storing means each said node data is stored in a record of at least one markup table according to the node's markup type, and wherein each said record contains a node id, node name (NAME), node parent (PID), and node data value (VALUE) columns.

13. The system according to claim 12, wherein the XML parse tree root, node elements, node element's descendants and siblings are stored in an ELEMENT table, and each node element's attribute is stored in an ATTRIBUTE table, and wherein the node parent PID of each said ATTRIBUTE table record points to the id of the node element record in the ELEMENT table.

14. The system according to claim 9, further comprising a means for querying the database markup tables using SQL queries to retrieve the XML document components in the XML format.

15. The system according to claim 14, wherein the querying means creating an XML result set in two stages, a SQL querying stage querying the markup tables to obtain a data result set, and a result set transformation stage for re-formatting the data result set to an XML data result set.

16. The system according to claim 15, further comprising a means for creating a reconstructed XML document by selecting all elements from the markup tables in the query.

17. A computer usable medium tangibly embodying a program of instructions executable by the computer to perform a computer-based markup serialization method for transferring data contained in an Extensible Markup Language (XML) document into a relational database stored in an electronic storage device having a database management system, for easy subsequent retrieval of data from the database in the XML format and reconstruction of the XML document, the method comprising the steps of:
(a) decomposing the XML document according to basic markup types of XML documents' data components; and
(b) storing the decomposed XML document in a set of markup tables created in the database, one markup table for each basic markup type.

18. The method according to claim 17, wherein the basic markup types are selected from a group comprising ATTRIBUTE, CDATA_SECTION, COMMENT, DOCUMENT_FRAGMENT, DOCUMENT, DOCUMENT_TYPE, ELEMENT, ENTITY, ENTITY_REFERENCE, NOTATION, PROCESSING_INSTRUCTION and TEXT markup types.

19. The method according to claim 17, wherein the decomposing step includes parsing the XML document to create a nested XML parse tree, and serializing the XML parse tree by traversing the path of each node from the root, wherein a basic markup type of each said node is identified by a markup tag in the XML document describing the markup type of a data component following the markup tag, and wherein each said node is described by a name, attributes, and an id representing the position of said node in the XML parse tree.

20. The method according to claim 19, wherein in the storing step each said node data is stored in a record of at least one markup table according to the node's markup type, and wherein each said record contains a node id, node name (NAME), node parent (PID), and node data value (VALUE) columns.

21. The method according to claim 20, wherein the XML parse tree root, node elements, node element's descendants and siblings are stored in an ELEMENT table, and each node element's attribute is stored in an ATTRIBUTE table, and wherein the node parent PID of each said ATTRIBUTE table record points to the id of the node element record in the ELEMENT table.

22. The method according to claim 17, further comprising a step of querying the database markup tables using SQL queries to retrieve the XML document components in the XML format.

23. The method according to claim 22, wherein the querying step creating an XML result set in two stages, a SQL querying stage querying the markup tables to obtain a data result set, and a result set transformation stage for reformatting the data result set to an XML data result set.

24. The method according to claim 23, further comprising a step of creating a reconstructed XML document by selecting all elements from the markup tables in the querying step.

25. A computer-based markup serialization method for transferring data contained in a markup based document into a relational database stored in an electronic storage device having a database management system, for easy subsequent retrieval of data from the database in the original document format and reconstruction of the document, the method comprising the steps of:
(a) decomposing the markup based document according to basic markup types of the documents' data components; and
(b) storing the decomposed document in a set of markup tables created in the database, one markup table for each basic markup type.

26. The method according to claim 25, wherein the decomposing step includes parsing the document to create a nested parse tree, and serializing the parse tree by traversing the path of each node from the root, wherein a basic markup type of each said node is identified by a markup tag in the document describing the markup type of a data component following the markup tag, and wherein each said node is described by a name, attributes, and an id representing the position of said node in the parse tree.

27. The method according to claim 26, wherein in the storing step each said node data is stored in a record of at least one markup table according to the node's markup type, and wherein each said record contains a node id, node name (NAME), node parent (PID), and node data value (VALUE) columns.

28. The method according to claim 27, wherein the parse tree root, node elements, node element's descendants and siblings are stored in an ELEMENT table, and each node element's attribute is stored in an ATTRIBUTE table, and wherein the node parent PID of each said ATTRIBUTE table record points to the id of the node element record in the ELEMENT table.

29. The method according to claim 25, further comprising a step of querying the database markup tables using SQL queries to retrieve the document components in the original document format.

30. The method according to claim 29, further comprising a step of creating a reconstructed document by selecting all elements from the markup tables in the querying step.

31. A computer-based markup serialization processor system for transferring data contained in a markup based document into a relational database stored in an electronic storage device having a database management system, for easy subsequent retrieval of data from the database in the original document format and reconstruction of the document, the system comprising:

means for decomposing the markup based document according to basic markup types of the documents' data components; and means for storing the decomposed document in a set of markup tables created in the database, one markup table for each basic markup type.

32. The system according to claim 31, wherein the decomposing means includes means for parsing the document to create a nested parse tree, and serializing the parse tree by traversing the path of each node from the root, wherein a basic markup type of each said node is identified by a markup tag in the document describing the markup type of a data component following the markup tag, and wherein each said node is described by a name, attributes, and an id representing the position of said node in the parse tree.

33. The system according to claim 32, wherein with the storing means each said node data is stored in a record of at least one markup table according to the node's markup type, and wherein each said record contains a node id, node name (NAME), node parent (PID), and node data value (VALUE) columns.

34. The system according to claim 33, wherein the parse tree root, node elements, node element's descendants and siblings are stored in an ELEMENT table, and each node element's attribute is stored in an ATTRIBUTE table, and wherein the node parent PID of each said ATTRIBUTE table record points to the id of the node element record in the ELEMENT table.

35. The system according to claim 31, further comprising a means for querying the database markup tables using SQL queries to retrieve the document components in the original document format.

36. The system according to claim 35, further comprising a means for creating a reconstructed document by selecting all elements from the markup tables in the query.

37. A computer usable medium tangibly embodying a program of instructions executable by the computer to perform a computer-based markup serialization method for transferring data contained in a markup based document into a relational database stored in an electronic storage device having a database management system, for easy subsequent retrieval of data from the database in the original document format and reconstruction of the document, the method comprising the steps of:

(a) decomposing the markup based document according to basic markup types of the documents' data components; and (b) storing the decomposed document in a set of markup tables created in the database, one markup table for each basic markup type.

38. The method according to claim 37, wherein the decomposing step includes parsing the document to create a nested parse tree, and serializing the parse tree by traversing the path of each node from the root, wherein a basic markup type of each said node is identified by a markup tag in the document describing the markup type of a data component following the markup tag, and wherein each said node is described by a name, attributes, and an id representing the position of said node in the parse tree.

39. The method according to claim 38, wherein in the storing step each said node data is stored in a record of at least one markup table according to the node's markup type, and wherein each said record contains a node id, node name (NAME), node parent (PID), and node data value (VALUE) columns.

40. The method according to claim 39, wherein the parse tree root, node elements, node element's descendants and siblings are stored in an ELEMENT table, and each node element's attribute is stored in an ATTRIBUTE table, and wherein the node parent PID of each said ATTRIBUTE table record points to the id of the node element record in the ELEMENT table.

41. The method according to claim 37, further comprising a step of querying the database markup tables using SQL queries to retrieve the document components in the original document format.

42. The method according to claim 41, further comprising a step of creating a reconstructed document by selecting all elements from the markup tables in the querying step.

\* \* \* \* \*